United States Patent [19]

Ferrigno

[11] Patent Number: 4,893,653
[45] Date of Patent: Jan. 16, 1990

[54] ELECTRICALLY CONTROLLED FAUCET

[76] Inventor: Joseph T. Ferrigno, 151-45 27th Ave., Flushing, N.Y. 11354

[21] Appl. No.: 293,214

[22] Filed: Jan. 4, 1989

[51] Int. Cl.$^4$ ............................................. F16K 11/24
[52] U.S. Cl. ................................ 137/607; 137/625.41; 251/129.12; 251/303
[58] Field of Search .............. 137/625.41, 607, 614.17, 137/454.6; 251/129.11, 129.12, 303

[56] References Cited

U.S. PATENT DOCUMENTS

| | | | |
|---|---|---|---|
| 2,977,437 | 3/1961 | Doane | 251/129.12 X |
| 3,342,214 | 9/1967 | Panerai et al. | 137/607 X |
| 3,706,324 | 12/1972 | Lyon | 137/625.41 |
| 3,916,951 | 11/1975 | Schmitt | 137/625.41 |
| 4,421,269 | 12/1983 | Ts'ao | 251/129.11 X |
| 4,611,757 | 9/1986 | Saether | 137/625.41 X |

*Primary Examiner*—Stephen M. Hepperle
*Attorney, Agent, or Firm*—Brumbaugh, Graves, Donohue & Raymond

[57] ABSTRACT

A household water faucet adapted for connection to the hot and cold lines of a domestic water system includes an electrical system controlled by pushbutton switches for selectively causing either hot, or cold, or a predetermined "warm" blend of hot and cold water to flow from the faucet, or stopping the flow by operating an "OFF" button. The faucet includes a cylindrical mixing valve supported for limited rotational movement within a bore in a main body to which hot and cold water is supplied. The mixing valve includes a pair of inlet ports oriented with respect to the hot and cold inlets to a main body such that in a first rotational position only cold water enters the mixing valve, in a second position only hot water enters the valve, in a third position both input ports are in partial registration with the hot and cold inlets to produce a mixture of hot and cold, and in a fourth position there is no registration of the inlets with the ports and the flow is turned off. The mixing valve is rotated to a selected rotational position by a reversible DC motor which is energized by selective actuation of pushbutton switches. In an alternative construction of the faucet an electrically controlled shutter valve is incorporated in the main body to provide adjustment of the rate of flow of water from the faucet.

16 Claims, 10 Drawing Sheets

ELECTRICALLY CONTROLLED FAUCET

BACKGROUND OF THE INVENTION

This invention relates generally to water faucets and, more particularly, to a water faucet including an electrical system for controlling the mix of hot and cold water and selectively dispensing either hot or cold water or water having a predetermined blend temperature.

Household faucets currently in most prevalent use are of two general types: an assembly having two control knobs for separately turning the hot and cold water on and off and controlling the amount of each supplied to a mixing chamber for establishing the temperature and rate of flow of water from the faucet, and an assembly having a single control, typically a handle positioned at the top of a mixing chamber and rotatable between an all hot position and an all cold position for controlling the mix of hot and cold water over a range of temperatures, and moveable vertically upwardly from an off position to adjust the rate of flow.

A primary object of the present invention is to provide an improved household water faucet which offers the convenience of push button control for automatically delivering water at an adjustable rate and at a desired predetermined blend temperature.

Another object of the invention is to provide a fluid mixing valve capable of adjustment by electrical means to selectively deliver fluid that is either hot or cold or a desired predetermined blend temperature.

Another object of the invention is to provide an esthetically pleasing household water faucet including an electrically controlled mixing valve controllable by push buttons to selectively obtain a desired flow of water that is either hot, cold or a predetermined blend temperature.

SUMMARY OF THE INVENTION

Briefly, the faucet according to the invention has a housing dimensioned for attachment to a standard sink and connection to the hot and cold lines of a domestic water system. Positioned at a convenient location on the housing are at least four push button switches labeled cold, hot, warm and off, each of which when activated supplies power to a reversible DC motor. When energized, the motor rotates a screw drive which causes longitudinal movement of a follower carried on the screw drive to, in turn, rotate a crank to a position determined by which switch is closed. The crank rotates a cylindrical mixing valve to cause either hot, or cold, or a predetermined blend of hot and cold water to flow from the faucet, or to stop the flow when the "OFF" switch is activated.

The valve mechanism includes a cylindrical mixing valve supported within a main body for limited rotational movement under control of the aforementioned crank and on which the rotatable member of each of a plurality of stacked printed circuit wafer-type switches are supported for rotation in unison with the mixing chamber. The combined action of a selected push button switch and a respective wafer switch rotating with the valve, establishes correct registration of ports in the mixing chamber with inlets for the hot and cold water.

Another embodiment of the inventive faucet includes two additional push button switches labeled "+" and "−" which when actuated supply D.C. potentials of opposite polarity, via a printed circuit wafer-type switch, to a second reversible D.C. motor. When energized by momentary depression of one or the other push button, this motor rotates a screw drive which causes longitudinal movement of a follower carried on the screw drive which, in turn, actuates a crank that rotates the rotatable member of the wafer-type switch, and also actuates a crank that controls a shutter valve incorporated in the main body to adjust the rate of flow from the faucet of water having a temperature selected by actuation of one of the other push button switches.

Other objects, features and advantages of the invention, and a better understanding of its construction and operation, will be had from the following detailed description, taken in conjunction with the accompanying drawings.

DESCRIPTION OF THE PREFERRED EMBODIMENT

Figure 1:
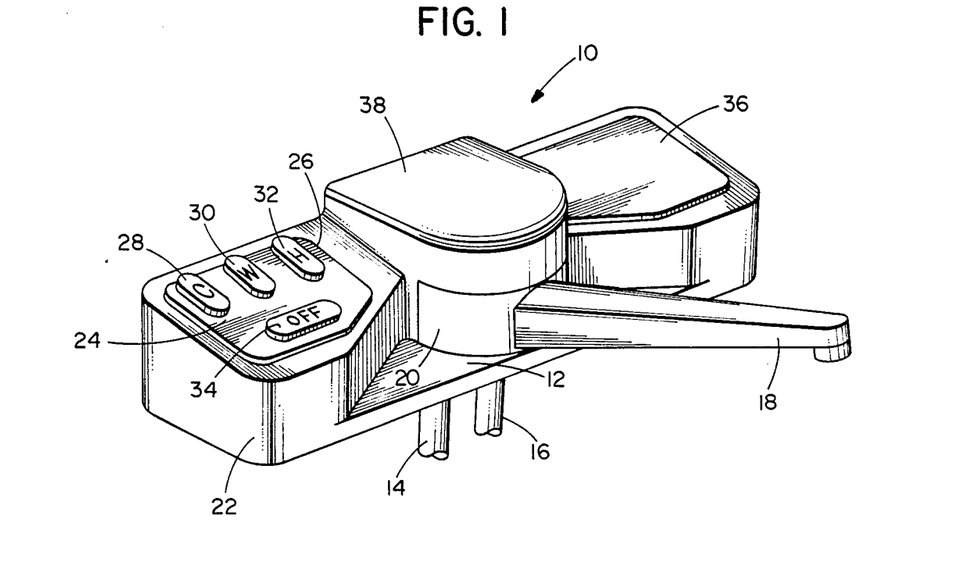
FIG. 1 is a perspective view illustrating the exterior of the inventive faucet.

As shown in FIG. 1, the faucet 10 according to the invention includes a base 12 sized for connection to a standard sink and having openings therethrough for connection to hot and cold inlet pipes 14 and 16, respectively, and an outspout 18 supported at its inner end on and communicating with the interior of a cylindrical outer shell 20 of the mixing valve. The shell 20 is rotatable about a vertical axis to permit adjustment of the outspout to any desired position. The shell 20, and the mechanism for adjusting a mixing valve supported within the shell, are enclosed in a thin-walled housing 22 having generally vertical side surfaces and a generally horizontal planar top surface. A panel 24 disposed in and closing an opening 26 in the upper surface of the housing, preferably located at the left side for reasons that will presently become apparent, supports four pushbutton switches 28, 30, 32 and 34 labeled "C", "W", "H" and "OFF", respectively, for cold, warm and hot and, of course, off. These buttons each control a respective single throw double pole switch each adapted to activate a DC motor disposed within the right-hand portion of the housing beneath a removable cover 36 to provide access, if necessary, to the motor and associated mechanism. An opening in the central upper surface of the housing normally closed with a removable panel 38 provides access to wafer-type switches supported within the housing above shell 20.

Figure 2:
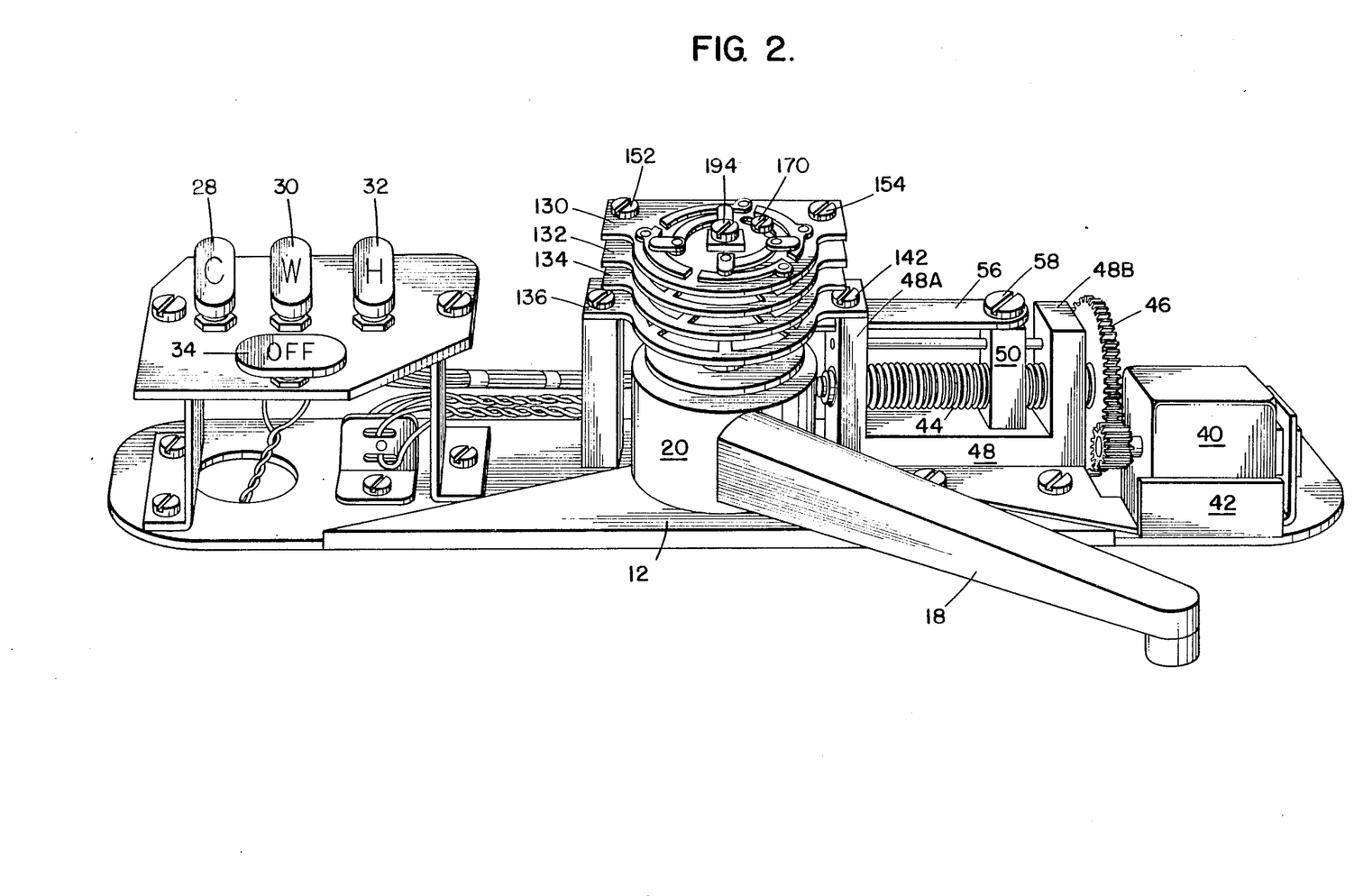
FIG. 2 is a perspective view of the faucet, with the outer housing removed.
Figure 3:
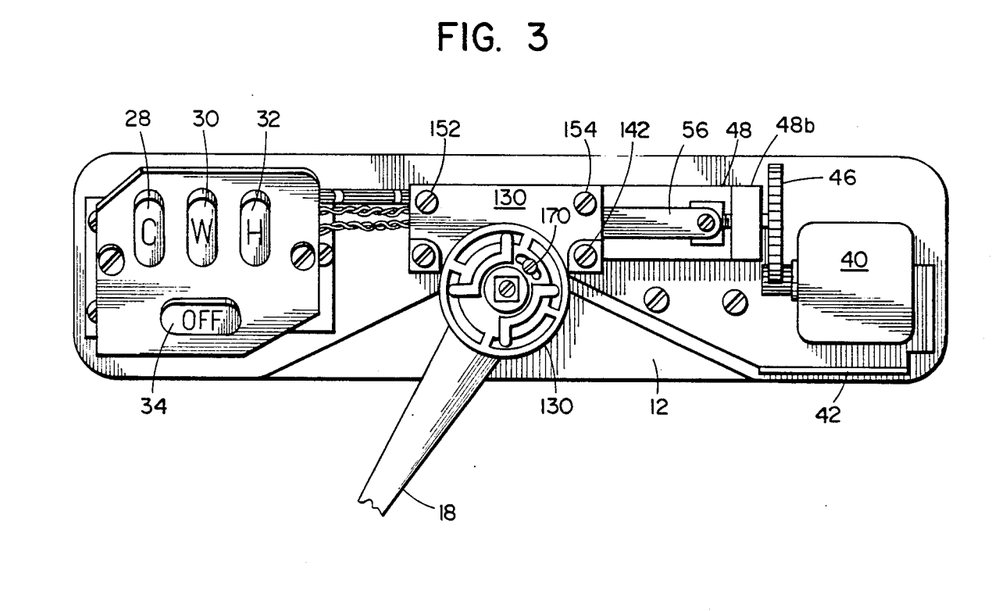
FIG. 3 is a top plan view of the faucet with the outer housing removed.
Figure 4:
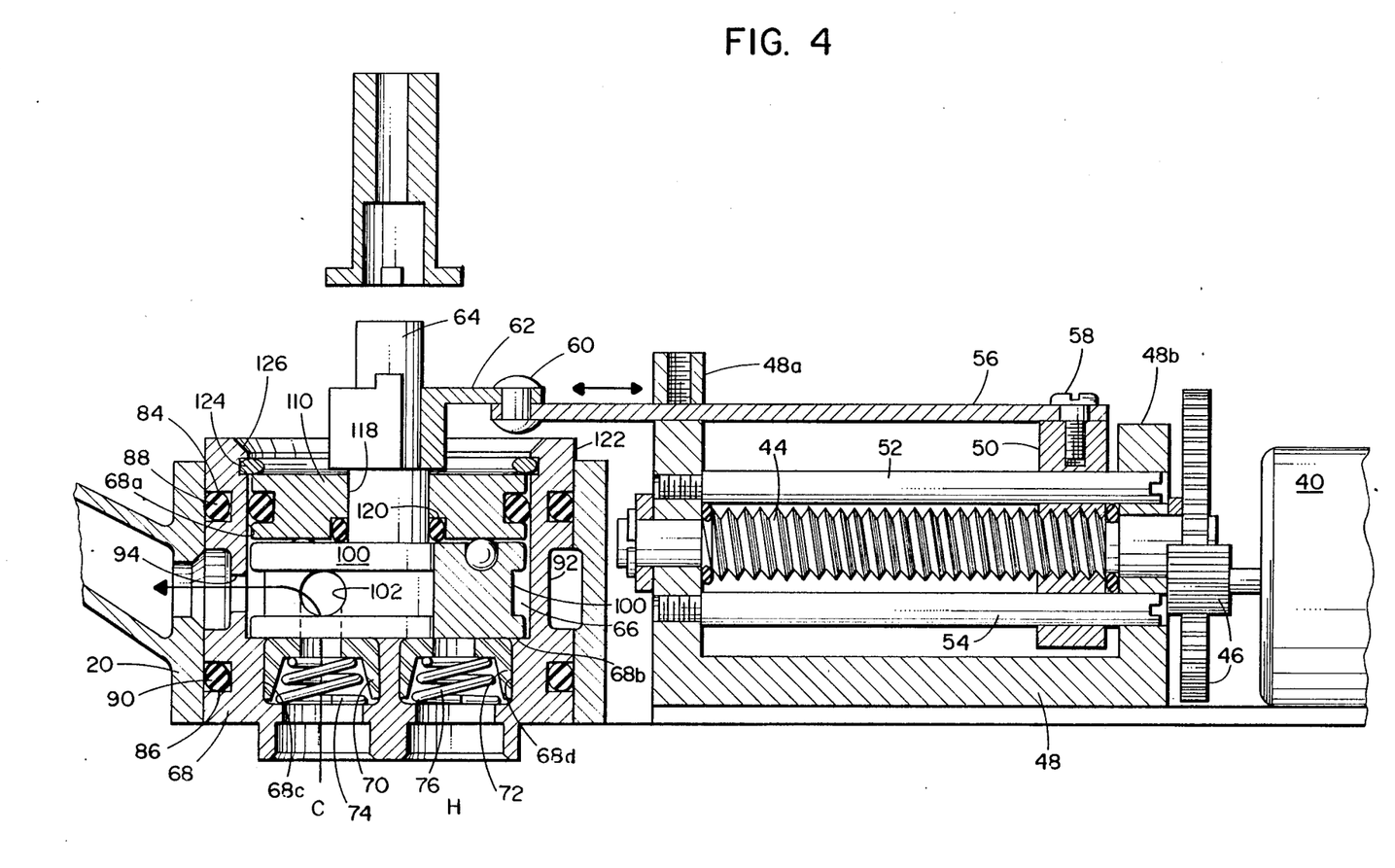
FIG. 4 is a sectional elevation view of the faucet.

Referring now to FIGS. 2, 3, and 4, actuation of a pushbutton energizes a reversible DC motor 40 supported on a bracket 42 secured to the base 12 which is coupled to and rotates a screw drive 44 though a reduction gear 46; the screw drive 44 is supported for rotation in bearings provided in the upstanding side walls 48a and 48b of a U-shaped bracket 48, also supported on base 12, and when rotated drives an internally threaded follower 50 carried thereon longitudinally of the screw in a direction determined by the direction of rotation of the motor. The follower 50 is held against rotation by a pair of guides 52 and 54 which pass with clearance through diametrically opposite openings through the follower, parallel to the drive screw, and are threaded into side wall 48a. Longitudinal motion of follower 50 is transferred to an arm 56 connected at one end to follower 50 by a screw 58 and attached at the other end by a rivet 60 to the outer extremity of a crank arm 62; the inner end of the crank engages a post 64 which rotates the mixing chamber, whereby back and forth movement of arm 56 causes crank 62 to rotate a mixing valve 66 either clockwise or counterclockwise within a cylindrical main body 68.

Figure 5:
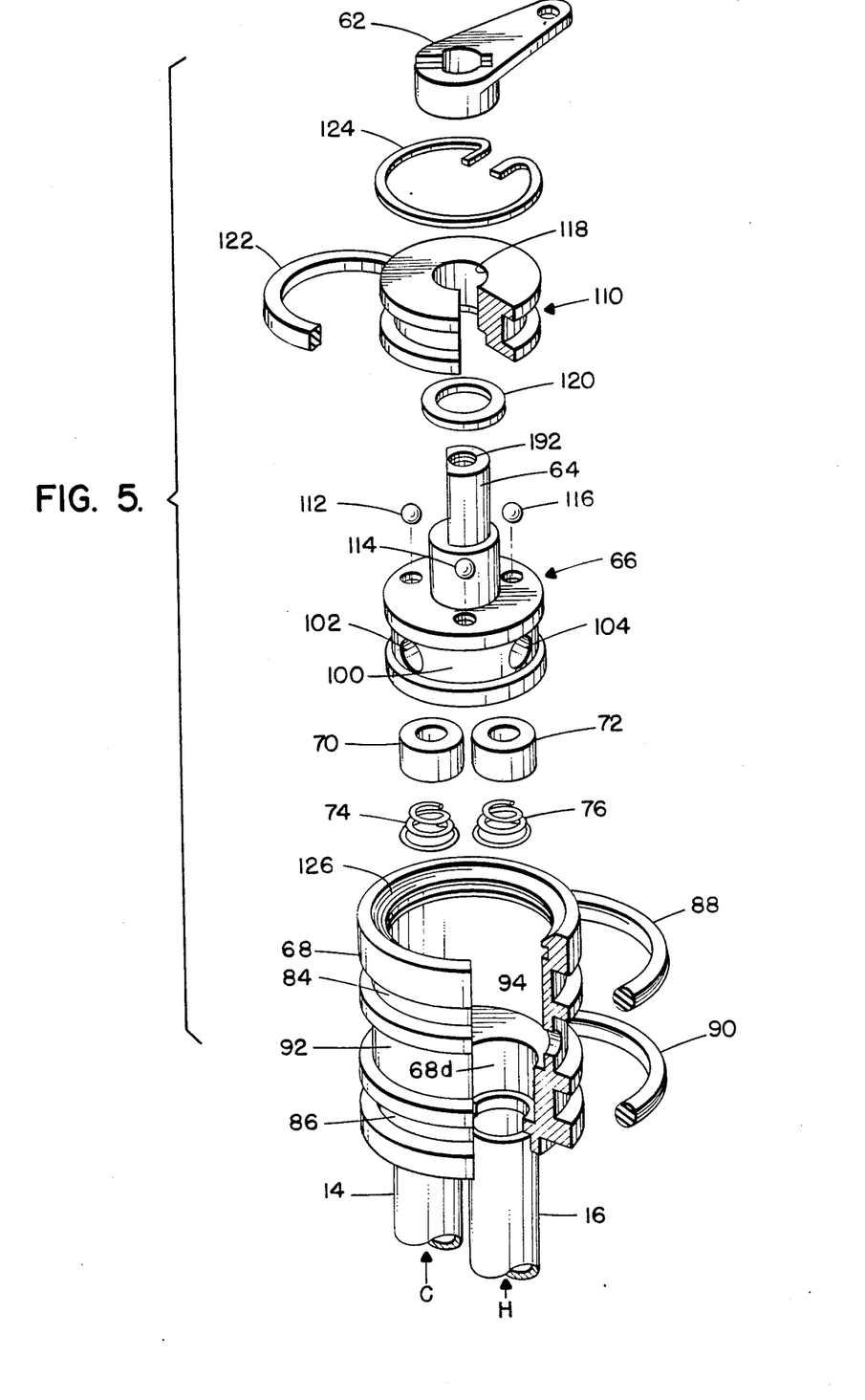
FIG. 5 is an exploded perspective view of the mixing valve of the faucet.

The main body 68, preferably formed of brass or other corrosion-resistant metal, has a cylindrical bore 68a of uniform diameter from the top downward for approximately ⅔ of its total height which bottoms at a circular surface 68b having circular openings 68c and 68d therethrough which respectively serve as inlets for hot and cold water. Semi-hard neoprene cups 70 and 72 are pressed into openings 68c and 68d, respectively, and firmly held therein by respective compression springs 74 and 76 each of which at its lower end engages a circumferential shoulder. The cups 70 and 72 each has a central opening for the flow therethrough of cold and hot water, respectively, introduced through inlet pipes 14 and 16 (FIG. 5).

Circumferential grooves 84 and 86 formed in the outer surface of the main body near opposite ends thereof support a pair of "O"-rings 88 and 90, respectively, for providing a water-tight seal between the main body 68 and the cylindrical shell 20 on which the outspout 18 is mounted. A relatively wide groove 92 in the region between "O"-rings 88 and 90 provides a passage for the flow of fluid from the interior of the main body through an opening 94 to the outspout regardless of the rotational position of the shell 20.

Figure 9:
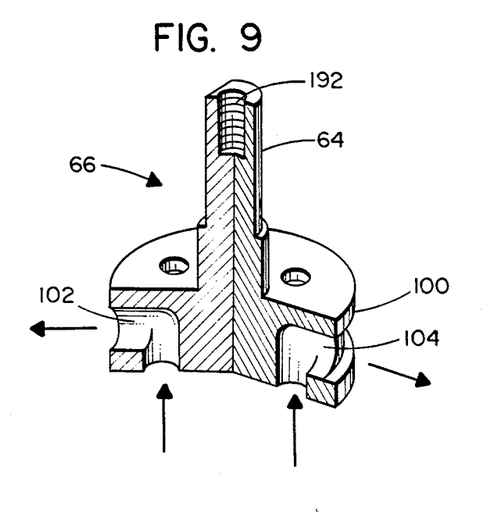
FIG. 9 is a sectional view of a portion of the mixing valve showing the construction of its fluid passages.

The mixing valve 66 consists essentially of a circular disk having an outside diameter throughout substantially equal to the diameter of the bore 68a in the main body except for a circumferential passageway 100 located intermediate the top and bottom surfaces of the disk. As best seen in FIG. 9, two circular openings 102 and 104 spaced 135° apart extend radially inward from the bottom of slot 100 to a depth approximately half the radius of the disk and there intersect circular openings of approximately the same size which extend downwardly through the lower surface of the disk and respectively provide passages for the flow of cold and hot water from the inlet pipes.

The mixing valve 66 is pressed downwardly against surface 68b by an annular sealing disk 110 pressing on three balls 112, 114, and 116 positioned in respective depressions in the upper surface of mixing chamber 66, the balls being provided to reduce friction between the sealing disk and mixing valve and the energy required to rotate the mixing valve. An integral flat-sided shaft 64 projects through a central opening 118 in the sealing disk and the crank 62 is placed over the upper end and secured thereto. An "O"-ring 120 pressed against the upper surface of the mixing valve by a circumferential shoulder 120 at the lower end of opening 118 provides a water-tight seal around the shaft, and another "O"-ring 122 held in place by a snap ring 124 which is secured in an inner circumferential groove 126 formed at the upper end of the bore of the main body and holds the sealing disk 110 in place.

Figure 6:
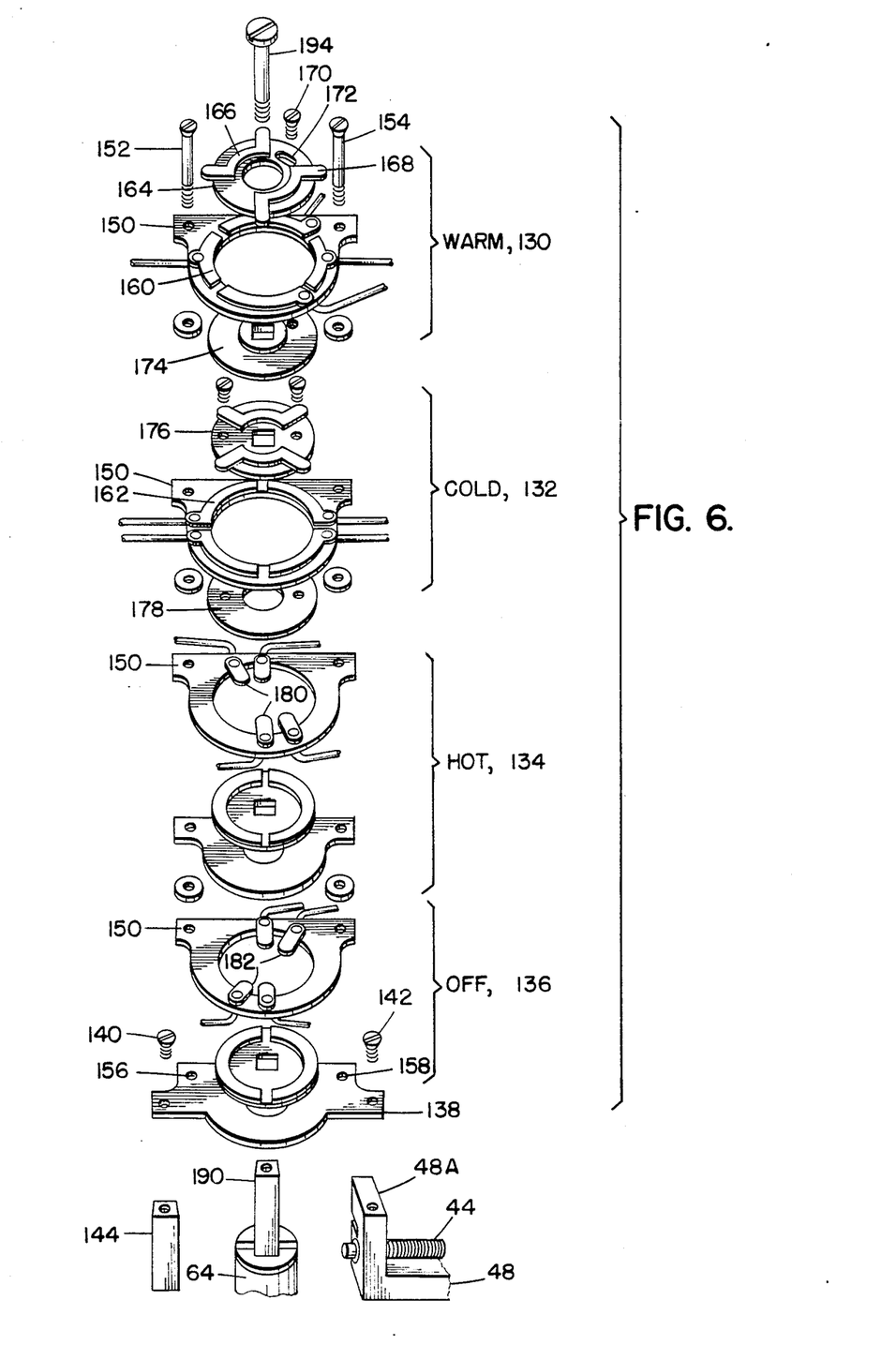
FIG. 6 is an exploded view of an assembly of wafer-type switches.

Four wafer-type rotatable switches 130, 132, 134 and 136 are stacked one above the other and supported concentrically with the post 64. The stacked switches, the construction details of each of which are illustrated in the exploded view of FIG. 6, are supported on a lower flange 138 which, in turn, is secured, as by screws 140 and 142, to an upstanding post 144 secured to base 12 and to the upstanding wall 48a of bracket 48. Each of the switches, of conventional design, includes a planar, insulative, supporting sheet 150 having a central circular opening dimensioned to receive a circular disk for relative rotation therein. The sheets 150 are maintained in vertical alignment by a pair of screws 152 and 154 which pass through openings at the rear corners thereof and are secured in threaded holes 156 and 158 formed in plate 138. In both of switches 130 and 132 the insulating plate 150 has a conductor pattern printed thereon consisting of four arcuate segments of approximately equal length, differing only in that the pattern 162 in switch 132 is rotated by about 45° relative to the pattern 160 in switch 130. The wiper assembly of switch 130 includes an annular-shaped insulative ring 164 having two conductive patterns 166 and 168, each consisting of an interconnected pair of fingers separated by 90° and projecting beyond the periphery of the disk for making wiping contact with the conductor pattern on sheet 150. The disk 164 is maintained in assembled relationship with the sheet 150 by a screw 170 which extends through an elongated slot 172 in disk 164 and is threaded into an insulative disk 174 at the underside of sheet 150. The construction of switch 132 is similar, differing only in the orientation of the wiping contacts on the rotatable disk 176, and the use of two screws instead of one to secure the wiper disk to an insulative disk 178 at the underside of sheet 150.

The construction of switches of 134 and 136 differs from that of switches 130 and 132 in that in both the wiper contacts 180 and 182, respectively, are supported on the upper surface of a respective sheet 150 and the rotatable disk caries the conductive pattern which, in both cases, consists of a pair of arcuate conductors each spanning approximately 180°.

The rotary members of all of the switches are rotated in unison in response to rotation of the mixing valve 66 by a square post 190 which at its lower end engages a threaded opening 192 in the top of post 64 and extends through and engages a square opening at the center of the rotatable wiper assembly of each of the switches. The assembled rotary members are secured together by a screw 194 which threadably engages the top of post 190.

Figure 7:
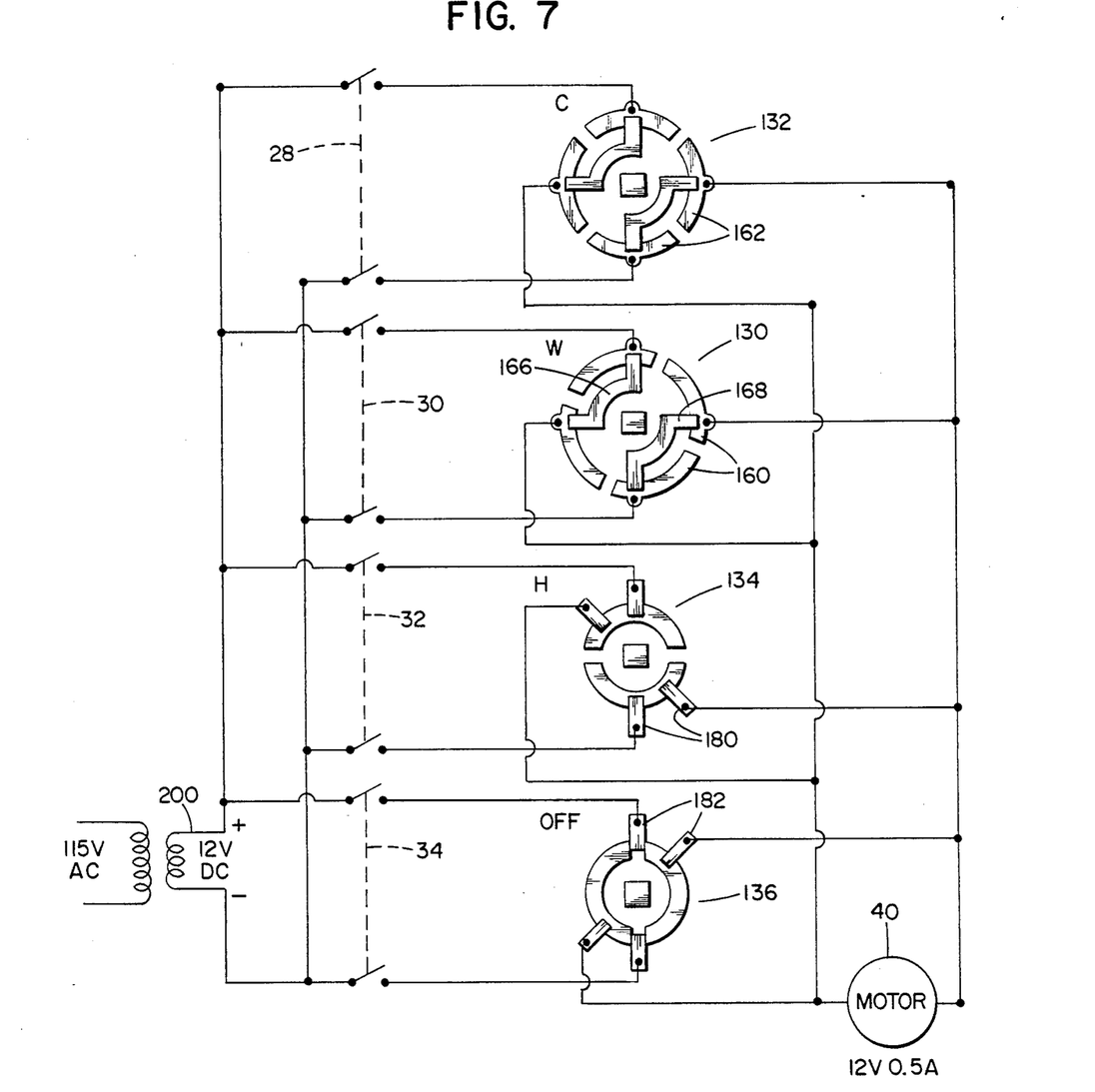
FIG. 7 is a schematic circuit diagram of an electrical control circuit for controlling the operation of the faucet.

As will seen from the schematic circuit diagram of FIG. 7, each of the push buttons on the exterior of the faucet actuates a respective single throw double pole switch 28, 30, 32 or 34 which when closed applies voltage from a suitable DC potential source 200 to two contacts of a corresponding wafer switch and thence via the other two contacts of the wafer switch to the terminals of reversible DC motor 40. As noted earlier, when the motor is energized it drives the screw drive 44 in rotation thereby to cause longitudinal movement of arm 56 and the crank 62 to rotate the mixing chamber 66. Due to the relative orientation of the conductor patterns on the four wafer switches and the fact that they are rotated in unison, when the "cold" button 28, for example, is closed the motor operates for the relatively short period necessary to move the follower 50 to a predetermined position on the screw 44, which, in turn, sets crank 62 at a selected angular position, and then stops. The same is true for the other three switches. Depression of the "OFF" switch 34, following use of water at one of the selected temperatures, places the wafer switches at the positions shown in FIG. 7 with the circuit to the motor interrupted by the "OFF" wafer switch 136. In the "OFF" condition, mixing valve 66 is positioned such that neither of passages 102 or 104 is aligned with its respective water inlet and water does not flow. Actuation of the COLD switch 28 causes motor 40 to rotate until the inlet port 102 of the mixing chamber registers with the cold water inlet (at which point the hot water inlet is out of registration with the hot water inlet port 104); closure of the HOT switch 32 causes the mixing valve 66 to be driven in rotation until hot water input port 104 is aligned with the hot water inlet; and when the warm switch 30 is depressed, mixing valve 66 is driven to a rotational position at which ports 102 and 104 are each partially aligned with their respective inlets to provide a blend temperature of hot and cold.

Figure 8:
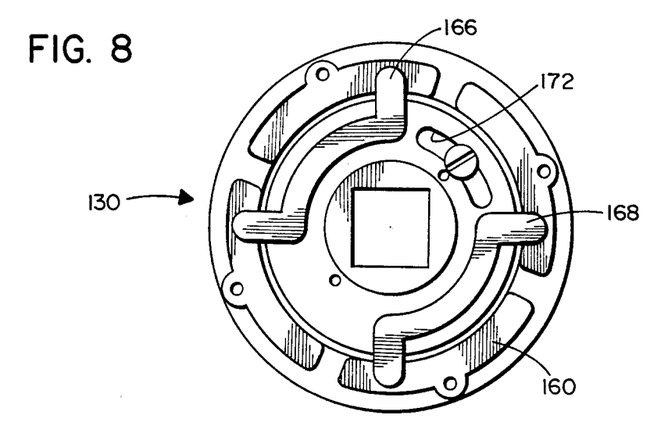
FIG. 8 is an enlarged plan view of the wafer switch that establishes the blend temperature of the warm water.

The blend temperature may be adjusted over a range of temperatures by adjusting the rotational position of the wiper contacts of switch 130 relative to square post 90, the elongated slot 172 being provided for this purpose. Counter clockwise rotation relative to the reference established by post 190 causes less travel of the mixing valve to the off position and a resulting colder blend temperature, and clockwise rotation causes an opposite effect and a warmer blend temperature. Once determined, the desired blend temperature is set by securing disk 164 at the adjusted position.

It will now have become apparent that the described embodiment of the faucet is very easy to operate and will automatically deliver water at the selected temperature each time the faucet is used, eliminating the need for manipulating faucet controls to obtain a desired "warm" temperature. The structure is compact and considerably smaller than it would appear from the enlarged showing of FIG. 2, and is fast-acting and quiet in operation. In an embodiment which has been successfully operated, the elapsed time between actuation of the "HOT" switch and delivery of hot water is on the order of a second or less, and the time required to obtain cold or warm water is somewhat less.

Figure 10:
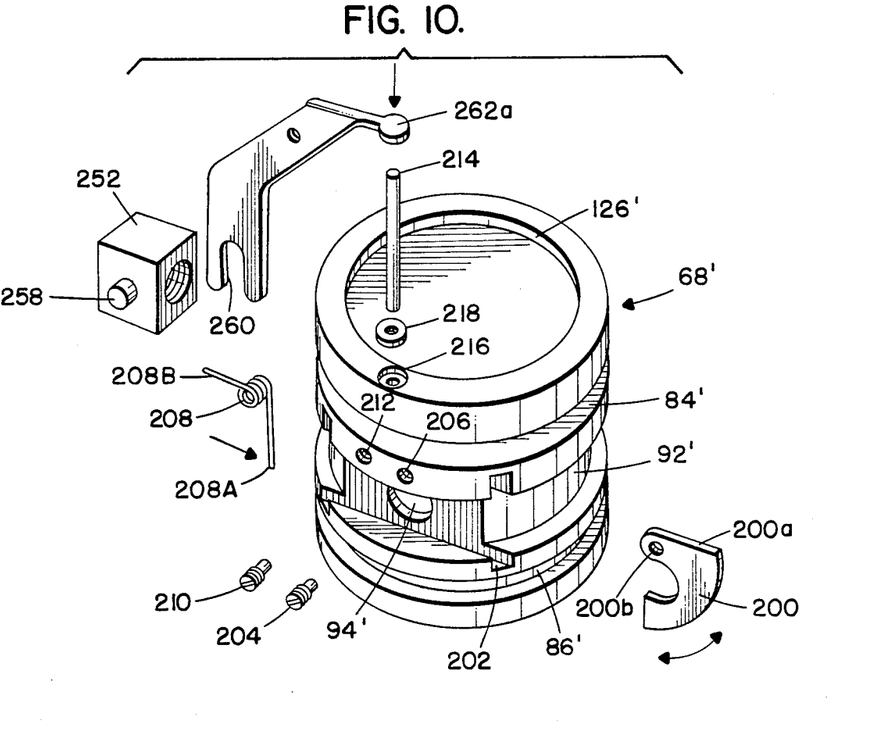
FIG. 10 is a exploded perspective view showing an alternative construction of the main body of the faucet.
Figure 11:
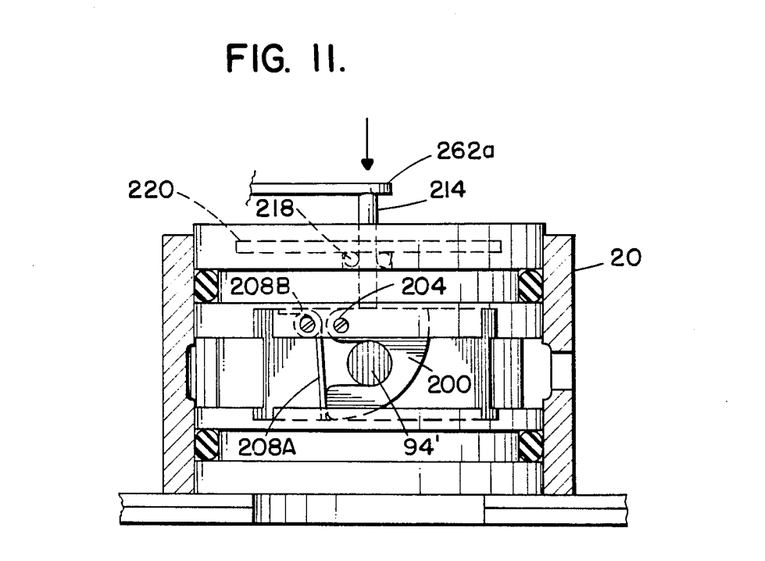
FIG. 11 is an elevation view, partly in section, of the main body shown in FIG. 10.

FIGS. 10-14 illustrate a modification of the described faucet which gives it the capability of controlling the rate of flow of water from the faucet. In general, the modification consists of a shutter valve incorporated in the main body for varying the size of the opening through which water is discharged from the main body to the outspout, and an electrically-powered mechanical linkage, controllable by a pair of push button switches, for actuating the shutter valve. Referring to FIGS. 10 and 11, in which the same reference numerals, except that they are primed, are used to identify like parts of the main body shown in FIGS. 4 and 5, the rate of flow of water from the opening 94' is controlled by the position of a generally "C"-shaped shutter 200 with respect to the opening 94'. The shutter 200, which has a straight upper edge surface 200a, is mounted in a narrow vertically oriented slot 202 disposed along a chord of a circle having a diameter slightly smaller than the outer diameter of circumferential groove 92' and intersecting the opening 94', for limited pivotal rotation about a pin 204 threadably engaging an opening 206 in the body wall and extending across the slot through an opening 200b in the shutter. The shutter is normally urged to the position shown in FIG. 11, that is, with its upper edge 200a in contact with the upper edge of slot 202, by one leg 208a of a coil spring 208 supported in slot 202 on a pin 210 which threadably engages an opening 212 in the body and extends through the coil, the other leg 208b of which engages the upper edge of slot 202. In this position of the shutter the opening 94' is unobstructed thereby to allow maximum flow; the flow rate is reduced by reducing the effective size of the opening by rotating the shutter clockwise against the bias of the spring by application of a downward force to its upper edge 200a with a vertically oriented pin 214 actuated by a lever mechanism, to be described presently. The pin is supported for sliding movement in a pin hole 216 drilled in the wall of and parallel to the axis of the main body which terminates in the upper edge of slot 202, and is sealed by an "O"-ring 218, which may be inserted via a slot 220 formed in the surface 126'.

Figure 12:
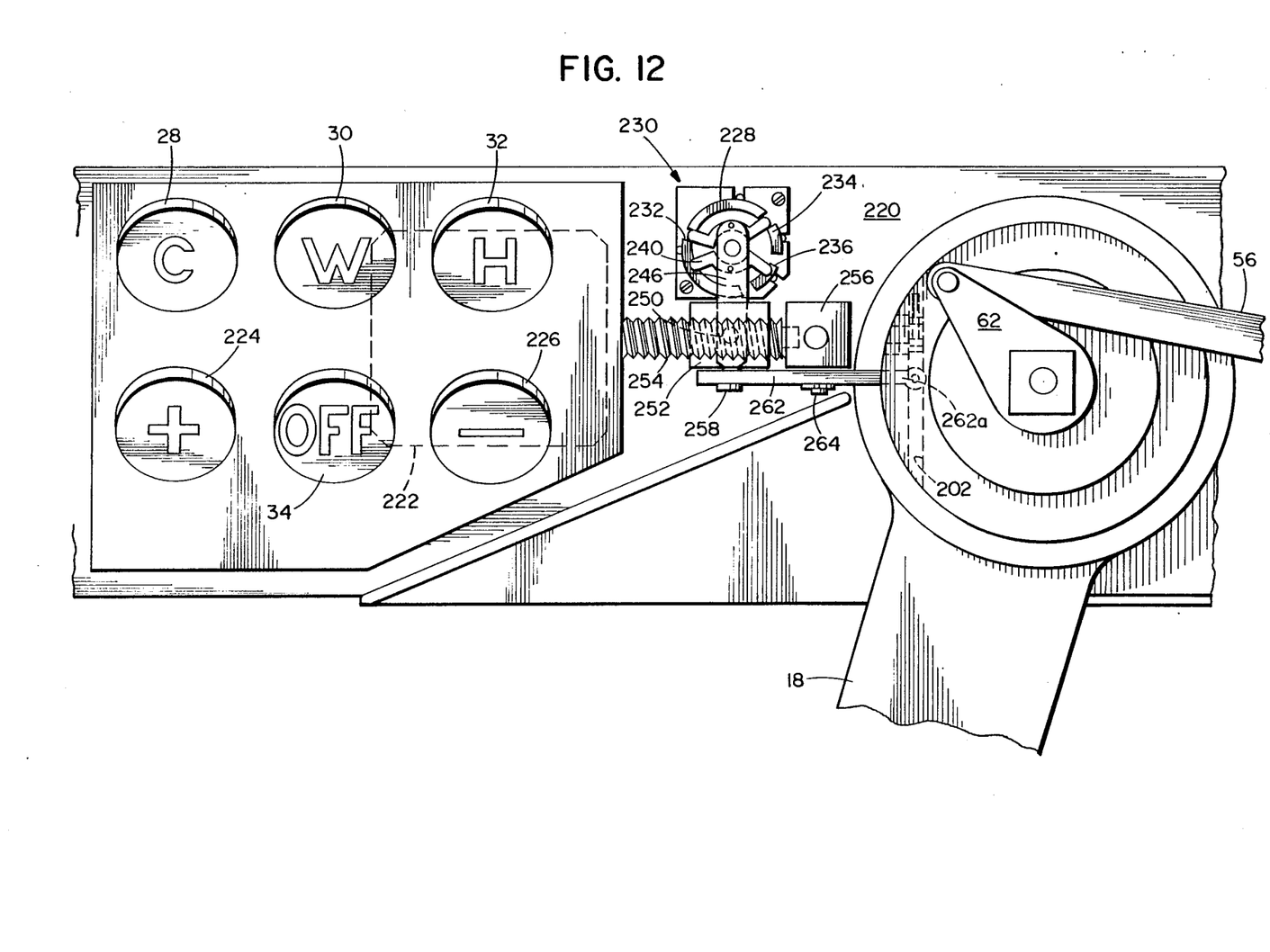
FIG. 12 is an enlarged fragmentary plan view illustrating an alternative embodiment of the faucet.
Figure 13:
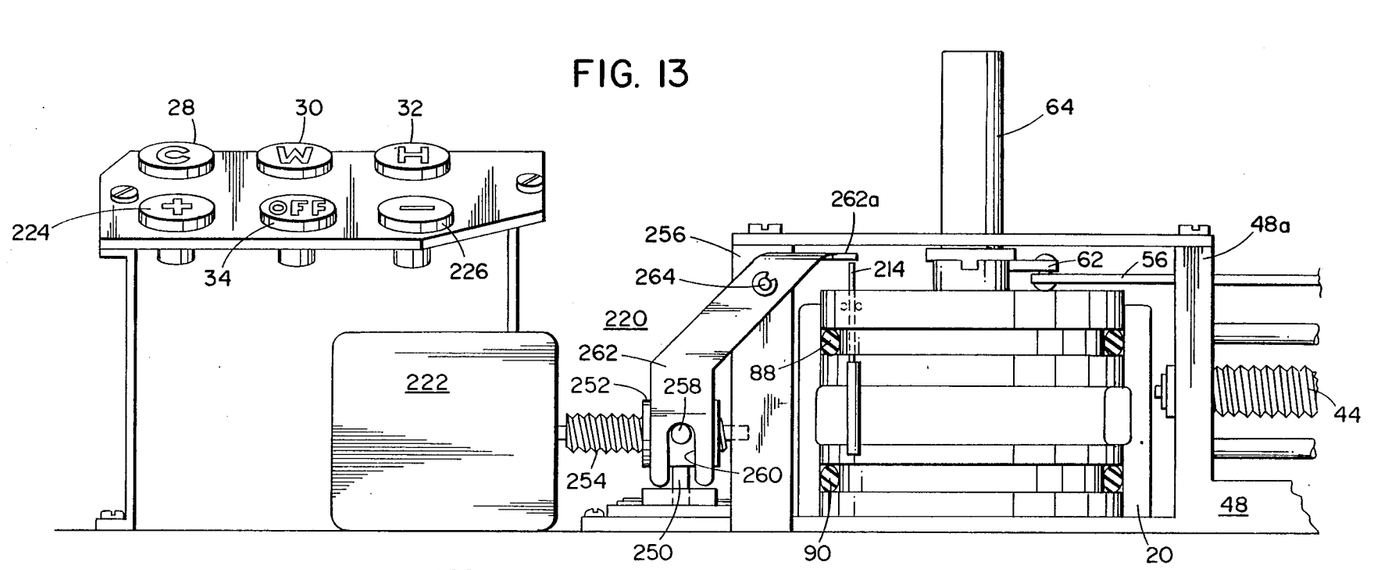
FIG. 13 is an elevation view of the portion of the faucet shown in FIG. 12.
Figure 14:
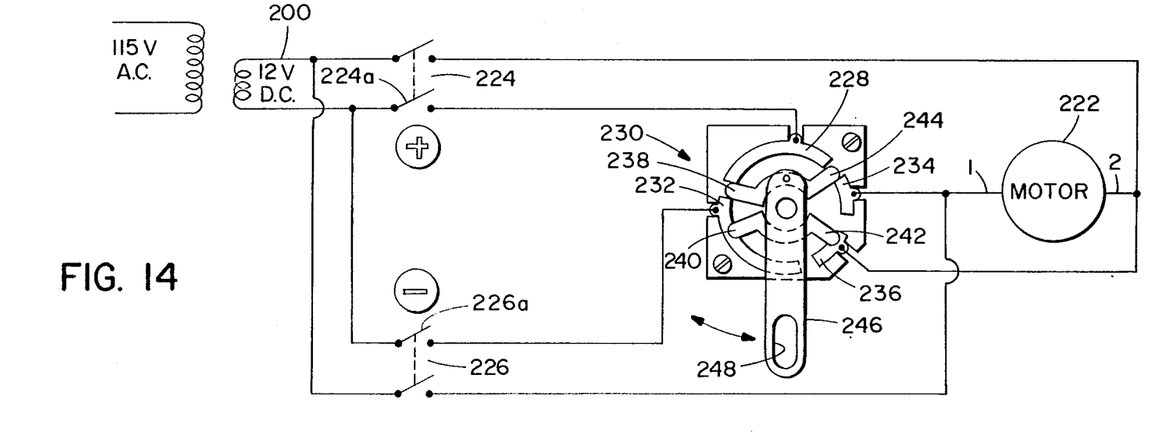
FIG. 14 is a schematic circuit diagram of an electrical control circuit for the alternative faucet shown in FIGS. 10-13.

Referring now to FIGS. 12-14, a lever mechanism 220 driven by a second reversible DC motor 222 controlled by an additional pair of push button switches 224 and 226 labeled "+" and "−", respectively, engages the upper end of pin 214 and causes the flow rate to increase when the "+" switch is closed and the rate to decrease when the "−" switch 226 is actuated. As shown in FIG. 14, when switch 224 is closed a DC potential of one polarity supplied from a suitable source, which may be the source 200 shown in FIG. 7, is applied to motor 222, and when switch 226 is closed a potential of opposite polarity is applied to the motor causing it to rotate in the opposite direction. When switch 224 is closed one terminal of D.C. source 200 is connected via its contactor 224a to a stationary arcuate contact 228 of a wafer-type rotary switch 230, and when switch 226 is closed (and switch 224 is open) the same terminal of the DC source is connected via its contactor 226a to another stationary arcuate contact 232. Two shorter stationary arcuate contacts 234 and 236, disposed generally diametrically opposite contacts 232 and 228, respectively, are connected to terminals 1 and 2, respectively, of motor 222. The rotary portion of switch 230 has four conductive fingers 238, 240, 242 and 244 arranged in pairs; fingers 240 and 242 are connected together and when the switch is in the position shown bridge arcuate contacts 232 and 236 and would, if switch 226 were closed at the same time, connect the aforementioned same terminal of the DC source to terminal 2 of motor 222. Similarly, fingers 238 and 244 are connected together and when rotated clockwise from the position shown in FIG. 14 bridge arcuate contacts 228 and 234, and if switch 224 were closed, would connect said same terminal to terminal 1 of motor 222.

The rotary portion of switch 230 is rotated clockwise and counterclockwise through a limited arc by an arm 246 which is secured at one end to the rotary portion. The other end of the arm is moved back and forth by a pin 250 (FIG. 12) depending from a threaded follower 252 carried on a screw drive 254 driven by motor 222 and engaging an elongated aperture 248 in the arm. The end of the screw drive not coupled to the motor is journaled in an upstanding post 256. The pin 250 holds the follower 252 against rotation by engaging an elongated slot formed in a flat plate 259 disposed below the follower. A pin 258 which projects horizontally from follower 252 engages an elongated slot 260 formed in one end of a flat lever arm 262 which is supported on a pivot 264, near the upper end of post 256 and slightly below the upper end of pin 214, for limited pivotal movement caused by limited back and forth motion of follower 252 as determined by the direction of rotation of motor 222.

When the follower 252 is in the position shown in FIG. 13 the horizontally extending upper end portion 262a of lever arm 262 does not contact and therefore does not apply any downward force on pin 214; accordingly, the shutter valve 200 will be fully open to provide maximum flow assuming, of course, that one of the "cold" "warm" or "hot" push buttons has been actuated. To reduce the flow rate, push button 226 is closed, causing counterclockwise rotation of the motor and screw drive 254 and longitudinal motion of follower 252 to the left which, in turn, causes the pin 258 to press against the left edge of slot 260 so as to rotate lever arm 262 about pivot 264 and cause the portion 262a to exert a downward force on pin 214 which, in turn, rotates shutter 200 against the bias of spring 208. When the desired decrease in the rate of flow is achieved push button switch 226 is released, whereupon that flow rate maintains until one or the other of switches 224 or 226 is again operated, or the faucet is turned off by actuation of switch 34.

The crank 246 coacting with pin 250 converts the longitudinal motion of follower 252 to rotational motion for rotating the rotary contacts of switch 230 through a limited arc, either clockwise or counterclockwise depending upon the direction of rotation of the motor. The operational range is essentially from the position shown in FIG. 14 where fingers 238 and 244 do not contact with their associated arcuate contacts 228 and 234, clockwise to a position where fingers 240 and 242 are out of contact with their arcuate contacts 232 and 236. Thus, switch 230 and its associated actuating mechanism essentially overrides switches 224 and 226 and establish the upper and lower limits of the flow rate.

Although exemplary embodiments of the invention have been disclosed herein, it is to be understood that this description is not to be regarded as a limitation to the scope of the invention and that it is subject to modifications and variations without necessarily departing from the spirit of the invention.

I CLAIM:

1. An electrically controlled faucet comprising, in combination:

a main body having a cylindrical bore and a pair of inlets at one end for inflow of fluids of two different temperatures, and an external circumferential passage to which a fluid of one temperature or a mixture of the two different temperature fluids discharges through an opening communicating the bore with the circumferential passage;

a circular disk-shaped mixing valve having top and bottom surfaces supported for limited rotation in the bore of said main body, said valve having a circumferential fluid passage formed in its external surface intermediate its top and bottom surfaces, and first and second input ports extending upwardly from the bottom surface and communicating with the circumferential passage, said first and second input ports being angularly spaced relative to the inlets in said main body so that in a first rotational position of said valve only fluid from one of said inlets flows through said first input port to said circumferential passage, in a second rotational position only fluid from the other of said inlets flows through said second input port to said circumferential passage, in a third rotational position fluids from both of said inlets flow through respective first and second input ports to said circumferential passage, and in a fourth rotational position there is no fluid flow from either of said inlets;

a cylindrical outer shell surrounding said main body in sealing rotational relationship therewith, said outer shell having an outspout through which fluid discharges from the external circumferential fluid passage of said main body; and circuit means including a first reversible DC motor mechanically coupled to said mixing valve and operative when energized to rotate said valve, a source of DC potential, and switch means including at least first, second and third manually-actuable switches each having a pair of contactors connected to said source of DC potential and a pair of contacts selectably connectable to respective terminals of said first motor through a respective wafer-type switch having stationary contacts and relatively rotatable contacts mechanically coupled to said mixing valve for rotation therewith for controlling application of DC potential to said first motor in dependence on actuation of a selected one of said first, second or third manually-actuable switches for rotating said mixing valve to a corresponding one of said first, second or third rotational positions thereby to discharge fluid from said outspout at one or the other of said different inlet temperatures or a predetermined blend of said inlet temperatures.

2. An electrically controlled faucet according to claim 1, wherein said mixing valve is enclosed in a housing, and wherein said switch means includes first, second, third and fourth manually-actuable pushbutton switches mounted on the exterior of said housing, each when actuated causing said first motor to position said mixing chamber at a respective one of its said first, second, third or fourth rotational positions.

3. An electrically controlled faucet according to claim 2, wherein each of said pushbutton switches is a single throw double pole switch the contactors of which are connected in parallel to the terminals of said source of DC potential, wherein the contacts of each of said push button switches are selectively connectable to respective terminals of said first motor through a respective wafer-type switch having a set of stationary contacts and a set of contacts that is rotatable relative to the stationary contacts, and wherein the rotatable contacts of said wafer-type switches are all rotated in unison by rotation of said mixing valve and by the same amount.

4. An electrically controlled faucet according to claim 3, wherein the mechanical coupling between said motor and said mixing chamber comprises means for converting rotational motion of said motor to back and forth longitudinal motion of an arm connected at one end to a crank arranged to impart rotational movement to said mixing valve in response to back and forth motion of said arm.

5. An electrically controlled faucet according to claim 4, wherein said wafer-type switches are stacked one above the other and supported above said mixing valve coaxially therewith, and wherein said mixing valve includes a post extending upward from the upper surface thereof and coaxially therewith for engaging and rotating the rotatable contacts of all of said wafer-type switches and to which said crank is secured.

6. An electrically controlled household water faucet comprising, in combination:

a cylindrical main body having a cylindrical bore which is open at one end and closed at the other end except for a pair of inlets for inflow of cold and hot water, respectively, and having an external circumferential passage to which either hot or cold water or a mixture thereof discharges through an opening communicating said passage with said bore;

a circular mixing valve having flat top and bottom surfaces sealingly supported on said other end of the bore of said main body for rotation relative to the main body, said mixing valve having an external circumferential fluid passage formed in its outer surface and having first and second input ports in its bottom surface which communicate with the circumferential fluid passage, said input ports being so oriented with respect to the inlets of said main body that in a first rotational position of said mixing valve only cold water from said first inlet flows through said first input port to said circumferential fluid passage, in a second rotational position only hot water from said second inlet flows through said second input port to said circumferential fluid passage, in a third rotational position both cold and hot water flows from said first and second inlets through said first and second input ports, respectively, to said circumferential fluid passage, and in a fourth rotational position there is no flow of water from either inlet;

a cylindrical outer shell surrounding said main body in sealing rotational relationship therewith, said outer shell having an outspout communicating with the circumferential fluid passage on said main body through which hot or cold water or a mixture thereof discharges regardless of the rotational position of the outer shell; and circuit means including a first reversible DC motor mechanically coupled to said mixing valve for rotating said valve when energized, a source of DC potential, and switch means including at least first, second and third manually-actuable switches each having a pair of contactors connected to respective terminals of said source of DC potential and a pair of contacts selectably connectable to respective terminals of said first motor through a respective wafer-type switch each having stationary contacts and relatively rotatable contacts mechanically coupled to said mixing valve for rotation therewith for controlling application of DC potential to said first motor in dependence on actuation of a selected one of said first, second or third manually-actuable switches for rotating said mixing valve to a corresponding one of said first, second or third rotational positions thereby to discharge water from said outspout that is either hot or cold or a predetermined blend of hot and cold.

7. A faucet according to claim 6, wherein said faucet includes a housing for enclosing said circuit means, and wherein said switch means include first, second, third and fourth manually-actuable pushbuttons mounted on the exterior of said housing each when actuated causing said motor to position said mixing chamber at a respective one of its first, second, third or fourth rotational positions.

8. A faucet according to claim 7, wherein each of said pushbuttons actuates a respective single throw double pole switch the contactors of which are connected to the terminals of said source of potential, wherein the contacts of each said switch are connectable to respective terminals of said motor through a wafer-type switch having a set of stationary contacts and a set of contacts that are rotatable with respect to the stationary contacts, and wherein said mixing valve includes means for rotating the rotatable contacts of all of said wafer-type switches in unison with said mixing valve.

9. A faucet according to claim 8, wherein the mechanical coupling between said motor and said mixing valve comprises a crank secured to the means on said mixing valve that rotates said rotatable contacts, and means for converting rotational motion of said motor to back and forth longitudinal motion of an arm connected at one end to said crank so as to impart rotational movement to said mixing valve.

10. A faucet according to claim 9, wherein said wafer-type switches are stacked one above the other and supported above said mixing valve coaxially therewith, and wherein said mixing valve includes a post extending upward from the center of the upper surface of said mixing chamber to the upper end of which said crank is secured, said post engaging the rotatable contacts of said wafer-type switches so as to rotate them in unison with the rotation of said mixing valve.

11. A faucet according to claim 10, wherein the rotatable set of contacts of the wafer-type switch connected to said third push button switch is rotationally adjustable relative to said post for adjusting the blend temperature of the water discharged from said outspout.

12. An electrically controlled faucet according to claim 1, wherein said main body has a shutter supported for relative movement with respect to the opening that communicates the bore of the main body with its circumferential passage for adjusting the effective size of said opening and correspondingly adjusting the flow rate of fluid from the faucet.

13. An electrically controlled faucet according to claim 12, wherein said shutter is pivotally supported in a vertically-oriented slot formed in the wall of said main body and is normally biased by a spring to a position in which it does not obstruct said opening and is rotated about its pivotal support against the bias of said spring to a desired adjusted position by the application of force to one end of a pin supported vertically in the wall of said main body and the other end of which engages said shutter.

14. An electrically controlled faucet according to claim 12, wherein said switch means additionally includes fifth and sixth push button switches which when actuated respectively cause an increase and decrease in the flow rate of fluid from the faucet.

15. An electrically controlled household water faucet according to claim 6, wherein said main body has a shutter pivotally supported in a vertically-oriented slot formed in the wall of said body for relative movement with respect to the opening that communicates the bore of the main body with its circumferential passage from a first position at which it does not obstruct said opening to a second position at which it fully closes the opening, said shutter being normally urged to said first position by a spring and being rotatable about its pivotal support against the bias of said spring to a desired adjusted position by means for applying a force to said shutter which opposes the bias of said spring.

16. An electrically controlled household water faucet according to claim 15, wherein said means for applying a force to said shutter comprises:
 a pin supported in the main body for up and down motion relative thereto, one end of which engages said shutter and the other end of which protrudes from said main body;
 a lever mechanism mechanically coupled to a second reversible D.C. motor which converts rotational motion of said second motor to limited pivotal movement of a lever arranged to engage and apply a downward force to said other end of said pin; and
 wherein said circuit means includes a pair of switches for controlling application of D.C. potential to said second motor and movement of said pin so as to rotate said shutter to said desired adjusted position.

* * * * *